United States Patent [19]

Buckle et al.

[11] 4,030,008
[45] June 14, 1977

[54] SINGLE PHASE ALTERNATING CURRENT MOTOR DUAL SPEED CONTROL CIRCUIT

[75] Inventors: Kenneth A. Buckle, Utica, Mich.; Edwin H. Halsted, Dayton; James O. Elliott, Xenia, both of Ohio

[73] Assignee: General Motors Corporation, Detroit, Mich.

[22] Filed: Jan. 26, 1976

[21] Appl. No.: 652,382

[52] U.S. Cl. .................. 318/220 B; 318/221 E; 318/221 G; 318/225 R; 318/227
[51] Int. Cl.² .................................... H02P 1/44
[58] Field of Search ....... 318/220 B, 221 R, 221 E, 318/221 G, 224 A, 225 R, 227

[56] References Cited

UNITED STATES PATENTS

| | | | |
|---|---|---|---|
| 2,743,406 | 4/1956 | London | 318/224 A |
| 3,049,654 | 8/1962 | Brucken | 318/225 R |
| 3,201,673 | 8/1965 | Williford et al. | 318/225 R |
| 3,389,316 | 6/1968 | Roby | 318/225 R |
| 3,560,825 | 2/1971 | Elliott | 318/227 |

*Primary Examiner*—Gene Z. Rubinson
*Attorney, Agent, or Firm*—Richard G. Stahr

[57] ABSTRACT

A circuit for providing dual speed operation of a single phase alternating current motor having high speed main and starting windings and a low speed main winding. A selectively energizable energizing circuit for the high speed main winding includes a current relay responsive to current flow through the high speed main winding for completing an energizing circuit for the high speed starting winding and a selectively energizable energizing circuit for the low speed main winding includes a bidirectional current translating device and a second current relay responsive to the flow of current through the low speed winding to complete the high speed main winding energizing circuit. The bidirectional current translating device is responsive to electrical control signals which are inhibited while the speed of the motor is greater than a predetermined value.

4 Claims, 1 Drawing Figure

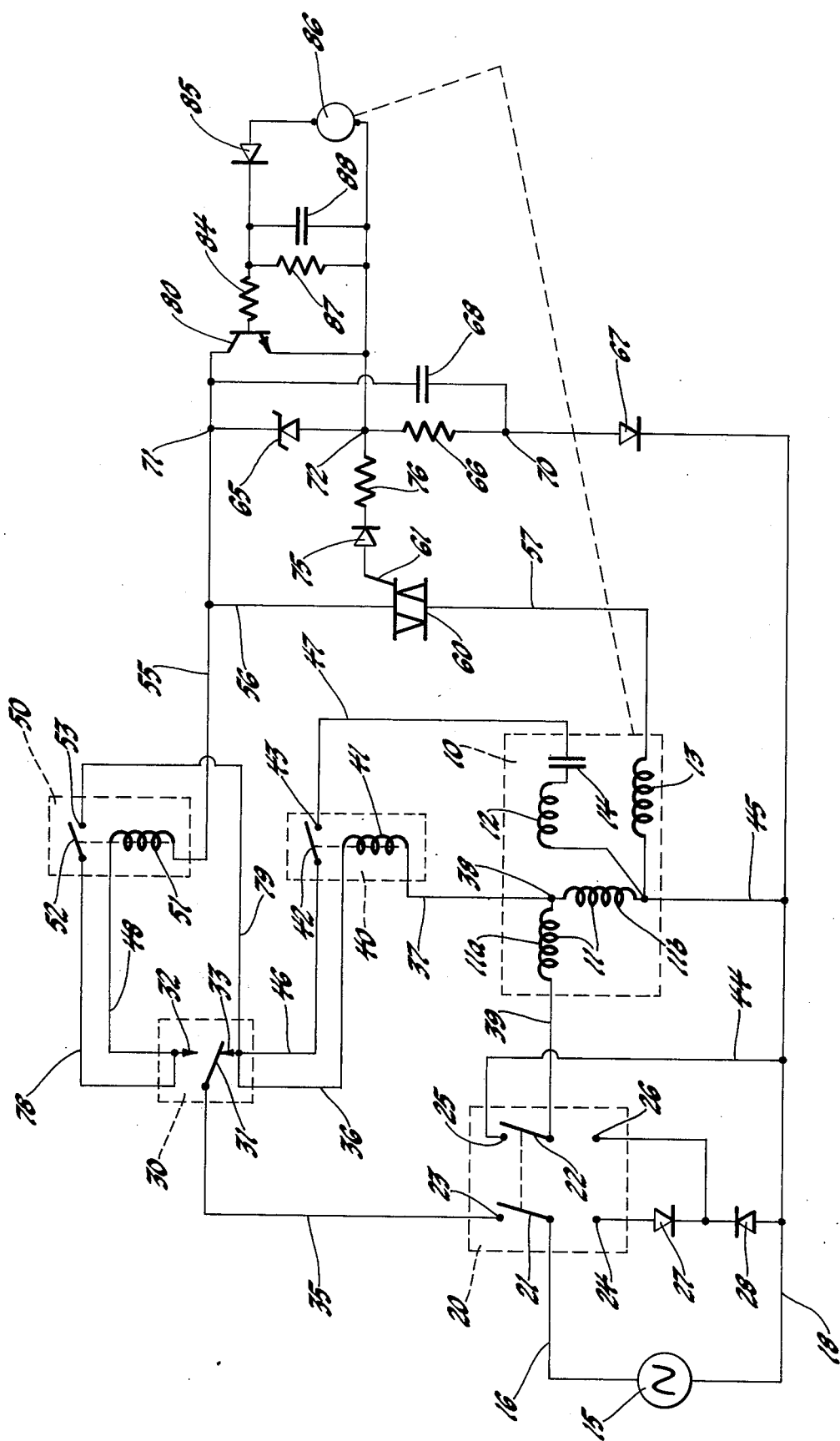

SINGLE PHASE ALTERNATING CURRENT MOTOR DUAL SPEED CONTROL CIRCUIT

This invention is directed to a single phase alternating current motor dual speed control circuit and, more specifically, to a single phase alternating current motor dual speed control circuit which permits the switching from high speed operation to low speed operation with a minimum of mechanical shock to the motor.

There are many applications which require at least dual speed operation of a single phase alternating current induction motor. In the prior art, the dual speed operation was provided by a complex switching arrangement which converted the stator windings from a first selected number of electrical poles to a second selected number of electrical poles which produced a different motor speed as is well known in the art. Therefore, the dual speed electric motors of the prior art were provided with high speed main and starting windings and low speed main and starting windings and were difficult if not impossible to switch from the high running speed to the low running speed before the motor had come to a standstill. Therefore, a single phase alternating current motor dual speed control circuit which requires a motor having only high speed main and starting windings and a low speed main winding which may be switched from high speed to low speed with a minimum of mechanical disturbance to the motor is desirable.

It is, therefore, an object of this invention to provide an improved single phase alternating current dual speed control circuit.

It is another object of this invention to provide an improved single phase alternating current motor dual speed control circuit which provides for the smooth switching from high to low speed.

It is an additional object of this invention to provide a single phase alternating current motor dual speed control circuit which provides for the energization of the low speed main winding after switching from high speed to low speed operation only after the motor has coasted down to a predetermined speed.

In accordance with this invention, a single phase alternating current motor dual speed control circuit for use with a single phase alternating current motor having high speed main and starting windings and a low speed main winding is provided wherein the current relay included in the high speed main winding energizing circuit is responsive to current flow therethrough to complete an energizing circuit for the high speed starting winding and the energizing circuit for the low speed main winding includes a bidirectional current translating device of the type capable of conducting electrical current in both directions in response to electrical control signals and a control responsive switching device sensitive to current flow therethrough for completing the high speed main winding energizing circuit.

For a better understanding of the present invention, together with additional objects, advantages and features thereof, reference is made to the following description and accompanying single FIGURE drawing which sets forth the single phase alternating current motor dual speed control circuit of this invention in schematic form.

Referring to the drawing, a single phase alternating current motor 10 includes a split high speed main or running winding 11 having a first section 11a and a second section 11b, a high speed starting or phase winding 12 and a low speed main or running winding 13. If desirable, a starting capacitor 14 may be inserted in series with the high speed phase or starting winding 12 as is well known in the art. It may be pointed out that motor 10 does not include a low speed starting or phase winding.

Motor 10 may be supplied by a source of single phase alternating current power 15 through a main switch 20. Main switch 20 may be any one of the several double pole-double throw switches well known in the art having two gang operated movable contacts 21 and 22, two stationary contacts 23 and 24 corresponding to movable contact 21 and two stationary contacts 25 and 26 corresponding to movable contact 22. Movable contacts 21 and 22 of main switch 20 are operable to the "off" position, in which position they are indicated in the drawing, to a "brake" position in which movable contacts 21 and 22 are in electrical circuit engagement with respective stationary contacts 24 and 26 and to a "run" position in which movable contacts 21 and 22 are in electrical circuit engagement with respective stationary contacts 23 and 25. The double pole-double throw main switch 20 provides for the inclusion of a dynamic braking circuit comprised of oppositely poled diodes 27 and 28 connected between stationary contact 24 of main switch 20 and main supply line 18. The special split high speed main winding 11 and diodes 27 and 28 are required for the dynamic braking feature. As this feature is disclosed and described in U.S. Pat. No. 3,340,449, assigned to the same assignee as is this invention, it will not be described in detail in this specification. In the event the dynamic braking feature is not required, main switch 20 may be of the single throw-double pole type and high speed main winding 11 need not be of the split winding type.

Single pole-double throw selector switch 30 provides for the selection of high speed or low speed operation. Selector switch 30 may be any of the commercially available single pole-double throw electrical switches well known in the art having a movable contact 31 and two stationary contacts 32 and 33.

For high speed operation, movable contact 31 of selector switch 30 is operated into the "high speed" position in which it is in electrical contact with stationary contact 33 and movable contacts 21 and 22 of master switch 20 are operated into the "run" position in which they are in electrical contact with respective stationary contacts 23 and 25. Upon the operation of the master switch 20 to the "run" position, a selectively energizable energizing circuit for high speed main winding 11 is completed. This energizing circuit may be traced from alternating current power source 15, through lead 16, movable-stationary contact pair 21-23 of master switch 20, lead 35, the movable-stationary contact pair 31-33 of selector switch 30, lead 36, operating coil 41 of a current responsive switching device which may be current relay 40 having an operating coil 41 and a normally open movable-stationary contact pair 42-43, lead 37 to junction 38 at which the circuit divides through a first branch including section 11a of high speed winding 11, lead 39, movable-stationary contact pair 22-25 of master switch 20 and lead 44 to the other side of alternating current power source 15 and a second parallel branch including section 11b of split high speed main winding 11 and leads 45 and 18 to the other side of alternating current power source 15. Upon the completion of this circuit, the flow of locked rotor current through high speed main winding 11 energizes operating coil 41 of current relay 40 sufficiently to operate movable-stationary contact pair 42-43 to the electrical circuit closed condition. Upon the operation of movable-stationary contact pair 42-43 of current relay 40 to the electrical circuit closed condition, an energizing circuit is completed for high speed starting winding 12 which may be traced from alternating current power source 15, through lead 16, movable-stationary contact pair 21-23 of master switch 20, lead 35, movable-stationary contact pair 31-33 of selector switch 30, lead 46, the now closed movable-stationary contact pair 42-43 of current relay 40, lead 47, starting capacitor 14, high speed starting winding 12 and leads 45 and 18 to the other side of alternating current power source 15. Upon the closure of the energizing circuit for high speed starting winding 12 by movable-stationary contact pair 42-43 of current relay 40, motor 10 starts and accelerates toward synchronous speed as determined by the number of electrical poles produced by high speed main winding 11 as is well known in the art. As the speed of motor 10 increases, the current flow through the previously described energizing circuits decrease in magnitude to a point at which operating coil 41 of current relay 40 is no longer energized sufficiently to maintain movable-stationary contact pair 42-43 thereof in the electrical circuit closed condition. At this point, movable-stationary contact pair 42-43 of current relay 40 operate to the electrical circuit open condition to interrupt the high speed starting winding 12 energizing circuit and motor 10 continues to run by the energized high speed main or running winding 11 near the synchronous speed as determined by the number of electrical poles produced by high speed main winding 11.

For low speed operation, movable contact 31 of selector switch 30 is operated to the "low speed" position in which it is in electrical contact with stationary contact 32 and movable contacts 21 and 22 of master switch 20 are operated to the "run" position in which they are in electrical contact with respective stationary contacts 23 and 25. Upon the operation of master switch 20 to the "run" position, a selectively energizable energizing circuit for low speed main or running winding 13 is completed and may be traced from alternating current power source 15, through lead 16, through movable-stationary contact pair 21-23 of master switch 20, lead 35, movable-stationary contact pair 31-32 of selector switch 30, lead 48, operating coil 51 of current relay 50 having a movable contact 52 and a stationary contact 53, leads 55 and 56, a bidirectional current translating device 60, lead 57, low speed main or running winding 13 and leads 45 and 18 to the other side of alternating current power source 15.

The bidirectional current translating device 60 may be of the type marketed by General Electric and known in the art as a "triac." Devices of this type conduct current during both half cycles of the applied voltage in response to a control signal applied to the gate electrode 61 thereof in a manner well known in the electronics art.

To produce the electrical control signals required for the proper operation of bidirectional current translating device 60, the series combination of a Zener diode 65, a current limiting resistor 66 and a rectifying diode 67 is connected across leads 55 and 18 and a capacitor 68 is connected across lead 55 and junction 70 between resistor 66 and diode 67. With the energizing circuit for low speed main or running winding 13 completed, the potential of alternating current power source 15 is applied across the series combination of Zener diode 65, series resistor 66 and diode 67 and across the series combination of capacitor 68 and diode 67. During those half cycles of the alternating current supply potential while lead 16 is of a positive polarity with respect to lead 18, a potential drop appears across Zener diode 65 which is of a positive polarity upon junction 71 with respect to junction 72 and capacitor 68 charges in such a manner that the potential upon the plate thereof connected to junction 71 is of a positive polarity with respect to junction 70. During those half cycles of the alternating current supply potential while lead 18 is of a positive polarity with respect to lead 16, rectifying diode 67 prevents the flow of current through the series combination of Zener diode 65, resistor 66 and diode 67, however, capacitor 68 discharges through Zener diode 65 to maintain the potential upon junction 71 of a positive polarity with respect to junction 72. Therefore, with both these conditions, an electrical control signal is applied to gate 61 of bidirectional current translating device 60. That is, while supply lead 16 is of a positive polarity with respect to supply lead 18, current flows from lead 55, through lead 56 into bidirectional current translating device 60, through gate electrode 61, diode 75, current limiting resistor 76, resistor 66, diode 67 and lead 18 to the other side of alternating current power source 15. While supply lead 18 is of a positive polarity with respect to supply lead 16, current flows from the plate of capacitor 68 connected to junction 71, through leads 55 and 56 into bidirectional current translating device 60, through gate electrode 61, diode 75 and resistors 76 and 66 to the opposite plate of capacitor 68. With bidirectional current translating device 60 conducting in both directions, the energizing circuit for low speed main or running winding 13 is completed. Upon the completion of this circuit, the flow of locked rotor current through low speed main winding 13 energizes operating coil 51 of current relay 50 sufficiently to operate movable-stationary contact pair 52-53 to the electrical circuit closed condition. Upon the operation of movable-stationary contact pair 52-53 to the electrical circuit closed condition, an alternate energizing circuit for high speed main or running winding 11 is completed and may be traced from alternating current power source 15, through lead 16, movable-stationary contact pair 21-23 of main switch 20, lead 35, movable-stationary contact pair 31-32 of selector switch 30, lead 78, the now closed movable-stationary contact pair 52-53 of current relay 50, leads 79 and 36, operating coil 41 of current relay 40, to the junction 38 between portions 11a and 11b of high speed main or running winding 11 and thence to the opposite side of alternating current power source 15 through circuitry previously described in detail. The flow of locked rotor current through high speed main or running winding 11 energizes operating coil 41 of current relay 40 sufficiently to operate movable-stationary contact pair 42-43 to the electrical circuit closed condition to complete the previously described energizing circuit for high speed starting or phase winding 12. Consequently, motor 10 starts and accelerates toward synchronous speed. As motor 10 accelerates, the current flow through low speed main or running winding 13 decreases in magnitude to a point at which operating coil 51 of current relay 50 is no longer energized sufficiently to maintain movable-stationary contact pair 52–53 in the electrical circuit closed condition. At this point, movable contact 52 is released out of electrical circuit engagement with stationary contact 53 to interrupt both the high speed main and starting winding energizing circuits and motor 10, therefore, operates near the synchronous speed as determined by the number of electrical poles generated by low speed main or running winding 13.

From this description, it is apparent that the single phase alternating current motor dual speed control circuit of this invention permits the starting and operation of motor 10 at the synchronous speed as determined by either high speed main or running winding 11 or low speed main or running winding 13 and that the high speed main and starting windings 11 and 12 are employed to start motor 10 for low speed operation. The circuitry also provides for the changing of the speed of motor 10 from the high speed operation to the low speed operation without intolerable mechanical stress upon motor 10 in a manner to be now explained.

Should motor 10 be operating in the high speed mode and selector switch 30 be suddenly switched from the "high speed" position to the "low speed" position, the high braking torque developed by the low speed main winding 13 when energized in the super synchronous state results in a sudden and intolerable braking stress upon the motor 10 mechanical system. To eliminate this problem, a speed feedback circuit is employed which prevents the energization of the low speed main or running winding 13 at speeds greater than a predetermined value such as the synchronous speed corresponding to the number of electrical poles generated by low speed main or running winding 13. This speed feedback circuit includes NPN transistor 80, current limiting resistor 84, diode 85, tachometer generator 86 and a filtering network comprised of resistor 87 and capacitor 88. Tachometer generator 86 may be of the type rotated by motor 10 and produces an output potential of a magnitude directly proportional to the speed of motor 10. In a practical application of the circuit of this invention, a tachometer generator of the toothed wheel permanent magnet type was employed. The circuit parameters of the speed feedback circuit are so selected that with motor speeds greater than a predetermined value, base drive current is supplied to NPN transistor 80 by tachometer generator 86 to render this device conductive through the collector-emitter electrodes thereof. Upon the conduction of NPN transistor 80 through the collector-emitter electrodes, the control signal produced across Zener diode 65, in a manner previously explained, is removed from across junctions 71 and 72. That is, with motor speeds greater than a predetermined value, the speed feedback circuit inhibits the production of the control signals for bidirectional current translating device 60. In the absence of these control signals, bidirectional current translating device 60 blocks the flow of current in both directions to interrupt the energizing circuit for low speed main or running winding 13 while the speed of motor 10 is greater than the predetermined value. As the switching of selector switch 30 from the "high speed" position to the "low speed" position, opens the energizing circuit for high speed main or running winding 11, motor 10 begins to coast down until the output potential of tachometer generator 86 is no longer great enough to break down the base-emitter junction of NPN transistor 80, at which time transistor 80 extinguishes. When transistor 80 extinguishes, the control signals are again produced across Zener diode 65 to render bidirectional current translating device 60 conductive in both directions to complete the energizing circuit previously described for low speed main or running winding 13, a condition which permits motor 10 to continue operation in the low speed mode.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. A single phase alternating current motor dual speed control circuit for use with a single phase alternating current motor having high speed main and starting windings and a low speed main winding comprising:
a selectively energizable energizing circuit for said high speed main winding including a first current responsive switching device sensitive to current flow through said high speed main winding for completing an energizing circuit for said high speed starting winding;
a selectively energizable energizing circuit for said low speed main winding including a bidirectional current translating device of the type capable of conducting electrical current in both directions in response to electrical control signals and a second current responsive switching device sensitive to current flow through said low speed main winding for completing an alternate energizing circuit for said high speed main winding;
means for producing electrical control signals for said bidirectional current translating device; and
means for inhibiting the producing of said control signals while the speed of said motor is greater than a predetermined value.

2. A single phase alternating current motor dual speed control circuit for use with a single phase alternating current motor having high speed main and starting windings and a low speed main winding comprising:
a selectively energizable energizing circuit for said high speed main winding including a first current responsive relay sensitive to current flow through said high speed main winding for completing an energizing circuit for said high speed starting winding;
a selectively energizable energizing circuit for said low speed main winding including a bidirectional current translating device of the type capable of conducting electrical current in both directions in response to electrical control signals and a second current relay sensitive to current flow through said low speed main winding for completing an alternate energizing circuit for said high speed main winding;
means for producing electrical control signals for said bidirectional current translating device; and
means for inhibiting the producing of said control signals while the speed of said motor is greater than a predetermined value.

3. A single phase alternating current motor dual speed control circuit for use with a single phase alternating current motor having high speed main and starting windings and a low speed main winding comprising:
a selectively energizable circuit for said high speed main winding including a first current relay having a normally open contact pair sensitive to current flow through said high speed main winding for completing an energizing circuit for said high speed starting winding through said normally open contact pair;

a selectively energizable energizing circuit for said low speed main winding including a bidirectional current translating device of the type capable of conducting electrical current in both directions in response to electrical control signals and a second current relay having a normally open contact pair sensitive to current flow through said low speed main winding for completing an alternate energizing circuit for said high speed main winding through said normally open contact pair;

means for producing electrical control signals for said bidirectional current translating device; and means for inhibiting the producing of said control signals while the speed of said motor is greater than a predetermined value.

4. A single phase alternating current motor dual speed control circuit for use with a single phase alternating current motor having high speed main and starting windings and a low speed main winding comprising:

a selectively energizable energizing circuit for said high speed main winding including a first current relay having a normally open contact pair sensitive to current flow through said high speed main winding for closing said normally open contact pair to complete an energizing circuit for said high speed starting winding;

a selectively energizable energizing circuit for said low speed main winding including a bidirectional current translating device of the type capable of conducting electrical current in both directions in response to electrical control signals and a second current relay having a normally open contact pair sensitive to current flow through said low speed main winding for closing said normally open contact pair to complete an alternate energizing circuit for said high speed main winding;

a Zener diode for producing electrical control signals for said bidirectional current translating device; and means for inhibiting the producing of said control signals while the speed of said motor is greater than a predetermined value.

* * * * *